NOISE REDUCTION IN FREQUENCY MODULATION SYSTEM

Filed Sept. 29, 1966 Sheet 1 of 2

INVENTOR
P. T. HUTCHISON
BY Roy M. Porter Jr.
ATTORNEY 3,440,569
Patented Apr. 22, 1969

3,440,569

NOISE REDUCTION IN FREQUENCY MODULATION SYSTEM

Paul T. Hutchison, Fair Haven, N.J., assignor to Bell Telephone Laboratories, Incorporated, Murray Hill, N.J., a corporation of New York Filed Sept. 29, 1966, Ser. No. 582,953
Int. Cl. H03c 3/08, 3/10, 3/20
U.S. Cl. 332—18 6 Claims This invention relates to frequency modulation systems and more particularly to methods and apparatus for reducing the level of noise relative to the modulated signal therein.

Since the differences between those types of modulation sometimes referred to in the art as "phase modulation" and those referred to as "frequency modulation" are immaterial for the purposes of the present invention, the term "frequency modulation" will be used herein exclusively with the understanding that the principles of the invention apply as well to corresponding aspects of phase modulation.

Recently the art of frequency modulation has been substantially advanced by the development of direct frequency deviators, particularly of the variable capacity or varactor types, which can produce a wide swing, high modulation index signal without the use of frequency multiplication. As efficient as those circuits otherwise are, they are sources of substantial thermal noise.

It is therefore an object of the present invention to improve frequency modulation systems.

It is a more specific object to reduce thermal noise in frequency modulators of the direct deviator type.

It is known in connection with frequency modulation systems of the type in which the modulated signal is multiplied in frequency a plurality of times to increase its modulation index, that the noise level of the signal is also multiplied. Specifically, the noise is increased by 20 log $N$ db where N is the integral multiplying factor. In accordance with the present invention it has been recognized that the converse is also true and that if a noise containing frequency modulated signal is frequency divided, the noise component in the divided output will be 20 log $N$ db less where N is the integral divisor.

Relying upon this fact the present invention proposes a system in which a desired output signal having a given center frequency and a given frequency deviation is produced by deriving a carrier signal N times said given center frequency and deviating said carrier signal N times said given deviation. The resulting deviated signal is then divided by N to produce the desired output. Neither the increase in the carrier frequency nor the multiplication of deviation increases thermal noise appreciably but the division of the deviated signal reduces its noise component by a factor corresponding to the divisor.

These and other objects and features, the nature of the present invention and its various advantages, will appear more fully upon consideration of the specific illustrative embodiments shown in the accompanying drawings and described in detail in the following explanation of these drawings, in which.

Figure 1:
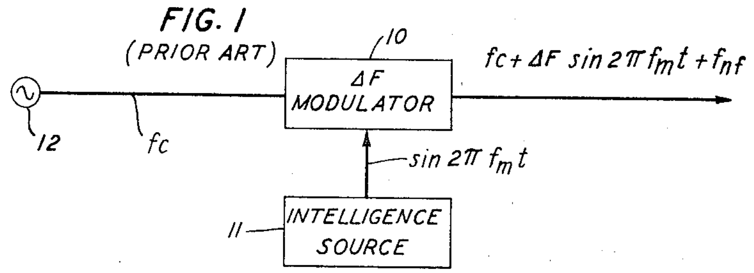
FIG. 1 (PRIOR ART)
FIG. 1 is a block diagram of a prior art frequency modulation system and is given for the purpose of explanation.

Referring more particularly to FIG. 1, the block diagram 10 symbolizes a prior art modulator circuit by which an intelligence bearing signal from source 11 is employed to frequency modulate a carrier $f_c$ from any suitable source such as oscillator 12 to produce a frequency modulated output having a peak deviation of $\Delta F$ cycles per second. Several specific circuits which may alternatively be employed for modulator 10 are known to the art. See, for example, Section 9–7, "Production of Frequency- and Phase-Modulated Waves," Radio Engineering by F. E. Terman, McGraw Hill, 1947.

If the signal from source 11 is expressed in the form $\sin 2\pi f_m t$, where $f_m$ is the modulating frequency, the instantaneous frequency output from modulator 10 can be expressed in the form:

$$f_c+\Delta F \sin 2\pi f_m t+f_{nf} \quad (1)$$

In Equation 1, the $f_{nf}$ term represents the instantaneous frequency deviation due to noise voltages internal to the modulator and is directly proportional to the magnitude of those voltages. Since frequency deviation due to noise is small, the amplitude of the first-order noise sidebands is directly proportional to the noise deviation. The level of the noise may or may not be flat over the spectrum but does have an average level that is inherent in a given modulator.

Figure 1A:
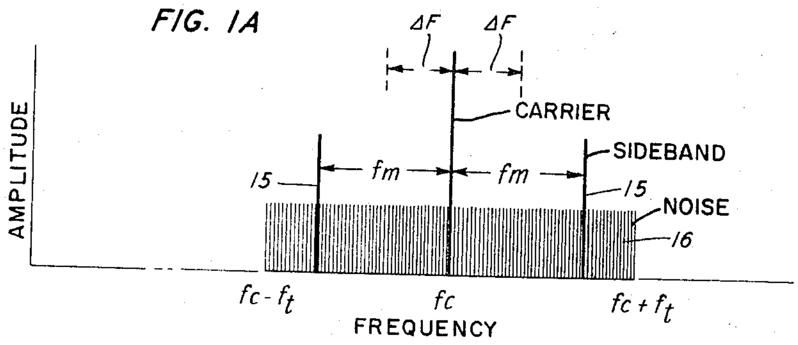
FIG. 1A is a typical frequency and noise spectrum to be expected in the system of the type shown in FIG. 1.

The spectrum diagram of FIG. 1A shows the output of modulator 10 including the frequency swing $\Delta F$, the desired first-order sidebands 15 having a given amplitude and spaced a frequency $f_m$ on either side of the carrier $f_c$, and a first-order noise spectrum 16 extending from $f_c-f_t$ to $f_c+f_t$, where $f_t$ is the highest modulating frequency to be used. FIG. 1A is given for the purpose of comparison with a corresponding diagram in accordance with the invention hereinafter.

Figure 2:
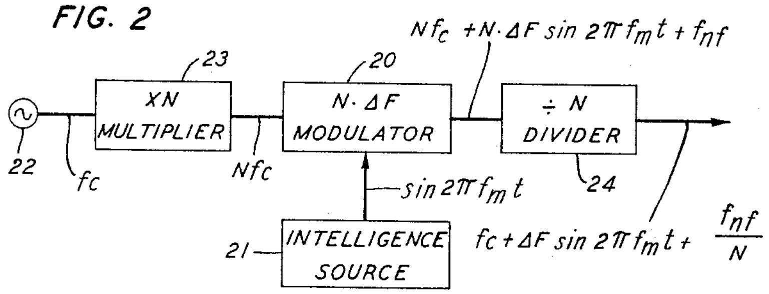
FIG. 2 is a block diagram of a frequency modulation system in accordance with the invention.

The block diagram of FIG. 2 illustrates a circuit arrangement according to the invention comprising carrier source 22 and an intelligence source 21 which are both the same as corresponding components of FIG. 1, and a modulator 20 which is of the same type as modulator 10 of FIG. 1 except that modulator 20 produces a frequency swing $N\cdot\Delta F$ that is N times that of modulator 10. The increase in frequency swing or deviation in modulator 20 may be obtained, for example, merely by increasing the amplitude of the signal from source 21. Interposed between source 22 and modulator 20 is a times N frequency multiplier 23, and between modulator 20 and the output is an N times divider 24. Preferably circuits 23 and 24 are of the type which include a nonlinear reactance such as a suitable biased varactor appropriately surrounded by input signal, output signal and idler signal resonant circuits. Many circuits of this type are bilateral to the extent that input and output may be reversed with proper adjustment to convert the circuit from a multiplier to a divider and vice versa. One such circuit is given by way of example in FIG. 4 hereinafter. On the other hand, circuit 23 may be one of the forms illustrated in Chapter 8 entitled "Multipliers" and circuit 24 of the form illustrated in Chapter 9 entitled "Dividers" in the text Varactor Applications by Penfield and Rafuse, MIT Press, 1962. Other forms of harmonic generators and subharmonic generators known to the art may also be used.

Figure 2A:
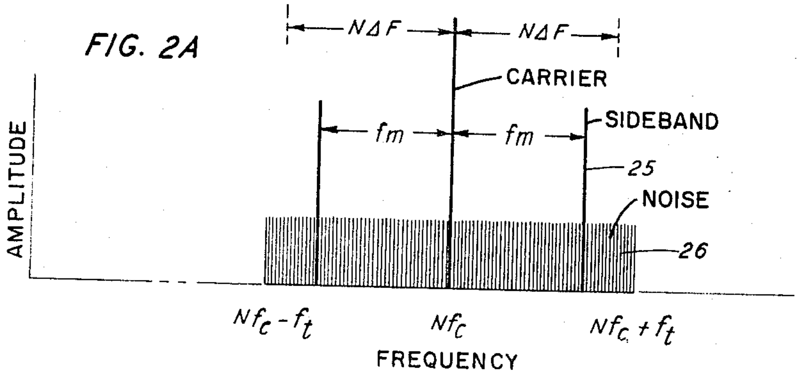
FIGS. 2A and 2B are typical frequency and noise spectrums at different points in the system of FIG. 2.

The instantaneous output frequency from modulator 20 may be expressed $$Nf_c+N\cdot\Delta F \sin 2\pi f_m t+f_{nf} \quad (2)$$

and its first-order spectrum is shown in FIG. 2A. A comparison of FIG. 2A with FIG. 1A indicates that increasing the deviation and the carrier frequency by N has increased the amplitude of the first order sidebands 25 by N but has not changed their frequency relative to the carrier nor substantially increased the level of thermal noise 26.

The effect of divider 24 is to reduce the carrier frequency from $Nf_c$ to $f_c$, the intelligence sideband deviation from $N\cdot\Delta F$ to $\Delta F$ and the noise deviation from $f_{nf}$ to $f_{nf}/N$ so that the instantaneous frequency of the output may be expressed $$f_c+\Delta F \sin 2\pi f_m t+\frac{f_{nf}}{N} \qquad (3)$$

Figure 2B:
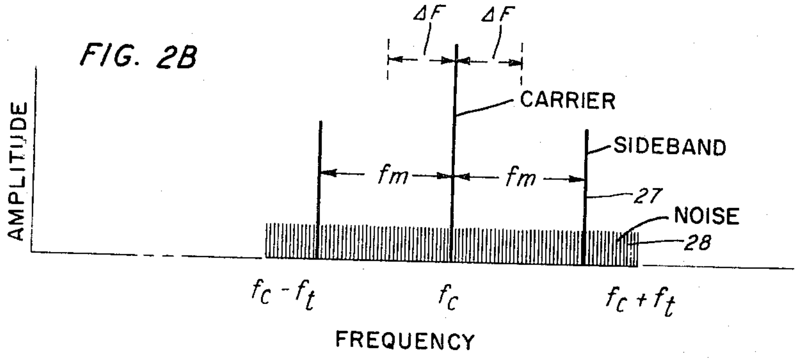

As noted hereinbefore, the level of both the intelligence sideband and noise are proportional to their deviation so that the resulting first-order spectrum is as shown in FIG. 2B. A comparison with FIG. 2A shows that in addition to the carrier frequency and the deviation, the level of intelligence sidebands 27 and the level of noise 28 have also been reduced by the factor N as compared with FIG. 2A. The spectrum therefore corresponds to FIG. 1A except that the level of noise 28 is N times less than the level of noise 16. There has thus been an improvement of N in the ratio of the sideband level to the noise level by the operation in accordance with the invention. Expressed in decibels the level of noise 28 is 20 log $N$ less than noise 16.

Figure 3:
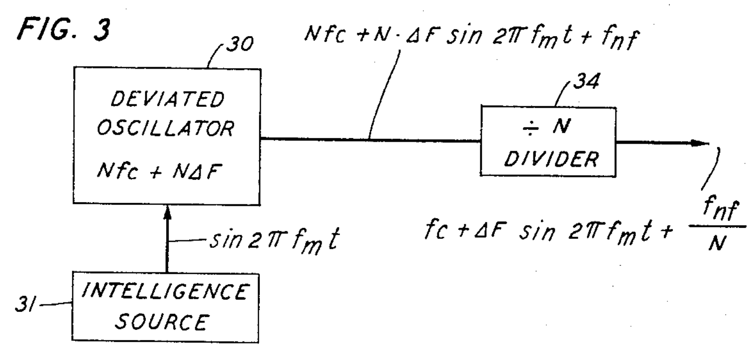
FIG. 3 is a frequency modulation system of the direct deviator type in accordance with a preferred embodiment of the invention.

The principles of the invention have thus far been illustrated with respect to the type of modulation in which the frequency of a separately generated carrier is modified by means of the intelligence signal. A preferred embodiment of the invention, however, involves a system in which the carrier frequency is directly varied by the intelligence signal as the carrier is generated. FIG. 3 illustrates the application of the principles of the invention to such a direct deviation frequency modulation system. Thus block 30 represents any suitable frequency variable oscillator having a center frequency $Nf_c$ which is N times the desired output frequency and is capable of being deviated $N\cdot\Delta F$ which is N times the desired output deviation.

In accordance with a preferred form of the invention, oscillator 30 is a varactor controlled oscillator of the type disclosed in Appendix E "Voltage Tuning" in the above-noted text by Penfield et al. Other such oscillator circuits are disclosed in Patents 2,984,794; 3,256,498; 3,252,108 or British Patent 1,029,792; or in publications Electrical Manufacturing, December 1954, page 83; Electronic Industries, July 1958, page 77. In general all of these circuits utilize the voltage controlled capacity of a varactor included as part of the tuned or tank circuit of the oscillator. When a DC bias on the varactor is varied, the resonant frequency of the tank is varied which varies the output frequency. This type of oscillator is capable of large deviation over a linear response range making it possible for $N\cdot\Delta F$ to be several times the required deviation $\Delta F$. The principles of the invention are, however, applicable to other forms of frequency variable oscillators whether reactance controlled or otherwise.

Regardless of its form, the output of oscillator 30 is considered to have the same components as the output of modulator 20 of FIG. 2 as expressed in Equation 2 and the same spectrum as shown in FIG. 2A. It has been experimentally verified that the level of thermal noise is for practical purposes independent of the deviation, increasing only slightly when the deviation is $N\cdot\Delta F$ as compared to the deviation of $\Delta F$.

The output of oscillator 30 is applied to divider 34 which may be the same as divider 24 of FIG. 2. The output of divider 34 is the same as that of divider 24, has the spectrum shown in FIG. 2B and the components defined in Equation 3. Thus the noise in the embodiment of FIG. 3 has been reduced by the same factor described with reference to FIGS. 1 and 2.

Figure 4:
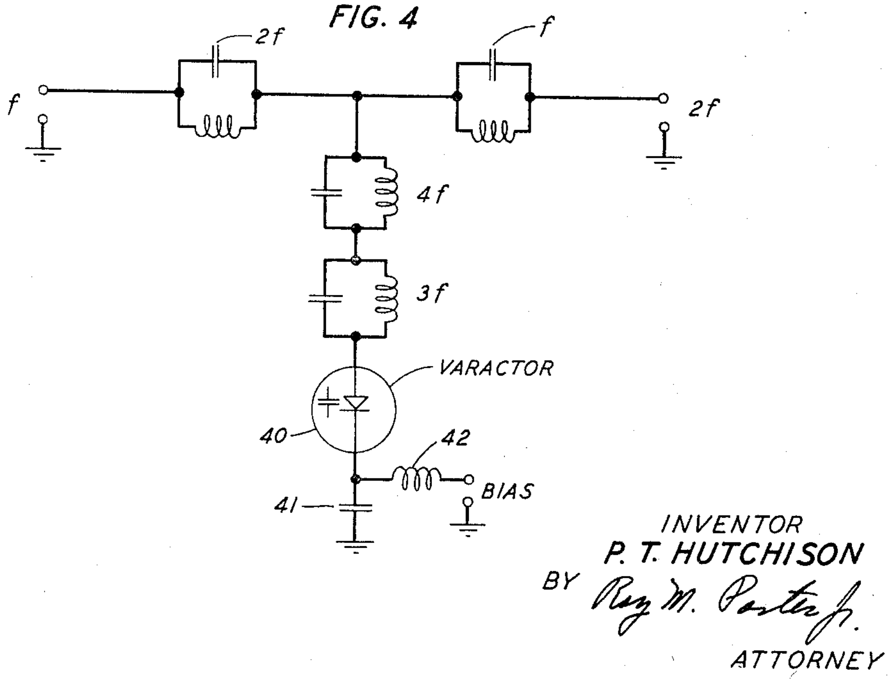
FIG. 4 is a typical schematic of a frequency multiplier or frequency divider which may be used in the embodiments of FIGS. 2 or 3.

A typical doubler circuit or divide-by-two circuit of the bilateral varactor type is shown in FIG. 4 which may be used for circuits 23, 24, or 34 in the foregoing block diagrams. Varactor 40 is included in the shunt arm of a T-bridge in series with parallel resonant circuits at the third and fourth harmonic frequencies $3f$ and $4f$, respectively. Bias is applied with an appropriate blocking condenser 41 and radio frequency choke 42 to varactor 40. The input and output circuits are separated by parallel resonant filter circuits at $f$ and $2f$ in the series arms of the T. If the circuit is fed with signals of frequency $f$ to the $2f$ filter, the circuit is a doubler producing an output of $2f$. If it is fed with $2f$ through the $f$ filter the circuit is a divider producing an output of $f$.

In all cases it is to be understood that the above-described arrangements are merely illustrative of a small number of the many possible applications of the principles of the invention. Numerous and varied other arrangements in accordance with these principles may readily be devised by those skilled in the art without departing from the spirit and scope of the invention.

What is claimed is:

1. A modulation system for producing a given intelligence bearing frequency deviation about a given center frequency comprising means for deriving a carrier of frequency N times said center frequency, means for deviating the frequency of said carrier N times said given deviation, and means for frequency dividing said deviated carrier by N to produce a signal having said given deviation and center frequency.

2. The combination according to claim 1 wherein said means for deriving comprise an oscillator operating at said carrier frequency and an N times multiplier circuit.

3. The combination according to claim 1 wherein said means for deriving comprise an oscillator operating a center frequency N times said carrier frequency and wherein said means for deviating comprise means for varying the frequency of said oscillator about said center frequency in response to an intelligence bearing signal.

4. The combination according to claim 1 wherein said means for dividing comprise a varactor in circuit with an input for passing a frequency N times said carrier to said varactor and an output for passing said carrier frequency from said varactor.

5. A modulation system for producing a given intelligence bearing frequency deviation about a given center frequency comprising an oscillator having a frequency N times said center frequency, means for deviating the frequency of said oscillator N times said given deviation about said center frequency in response to an intelligence bearing signal, a nonlinear reactance, means for applying the deviated output of said oscillator to said reactance and means for receiving from said reactance a signal having $1/N$ the frequency of said deviated output to produce a signal having said given deviation and center frequency and $1/N$ the noise of said deviated output.

6. The method of producing a frequency modulated output signal having reduced noise which comprises the steps of deriving a carrier signal of frequency that is N times the frequency of the desired output center frequency, varying the frequency of said carrier according to an intelligence signal over a frequency swing that is N times the desired frequency swing of said output, and frequency dividing said varied signal by the divisor N.

References Cited

UNITED STATES PATENTS

| | | | |
|---|---|---|---|
| 3,098,981 | 7/1963 | Foster et al. | 332—30 X |
| 3,205,455 | 9/1965 | Gunn et al. | 332—30 X |
| 3,304,518 | 2/1967 | Mackey | 332—16 X |

ALFRED L. BRODY, *Primary Examiner.*

U.S. Cl. X.R.

332—30; 325—42, 65, 147; 334—15; 307—320